United States Patent [19]

Cowham et al.

[11] 3,813,487

[45] May 28, 1974

[54] DETECTION DEVICES FOR IMAGE ANALYSIS SYSTEMS

[75] Inventors: Michael John Cowham, Sawston; David Edward Wadlow, Royston, both of England

[73] Assignee: Image Analysing Computers Limited, Royston, England

[22] Filed: Feb. 17, 1972

[21] Appl. No.: 227,160

[30] Foreign Application Priority Data

Feb. 25, 1971 Great Britain .......................... 5390/71
Dec. 16, 1971 Great Britain .......................... 58584/71

[52] U.S. Cl. ............ 178/7.1, 178/DIG. 26, 328/146
[51] Int. Cl. .............................................. H04n 5/21
[58] Field of Search ........... 328/147, 146, 150, 151; 178/7.3 DC, 7.5 DC, DIG. 26, DIG. 29

[56] References Cited

UNITED STATES PATENTS

| | | | |
|---|---|---|---|
| 2,855,513 | 10/1958 | Hamburgen et al. | 178/DIG. 26 |
| 2,885,551 | 5/1959 | Grean | 328/146 |
| 2,978,537 | 4/1961 | Kruse, Jr. et al. | 178/DIG. 29 |
| 3,278,851 | 10/1966 | Damon, Jr. et al. | 328/147 |
| 3,599,105 | 8/1971 | Weir et al. | 328/146 |
| 3,649,755 | 3/1972 | Newman | 178/7.5 DC |

*Primary Examiner*—Robert L. Griffin
*Assistant Examiner*—Joseph A. Orsino, Jr.
*Attorney, Agent, or Firm*—Browne, Beveridge, Degrandi & Kline

[57] ABSTRACT

Circuit modifications to a known detection device by which video signal amplitude excursions are converted into a two value signal by comparing the video signal with a reference voltage, which is derived from the local peak value of the video signal by means of a peak rectifying circuit comprising a rectifying diode and capacitor. One aspect of the invention provides a HOLD-discharge circuit which normally prevents the capacitor voltage of the peak rectifying circuit from decaying, a subsidiary peak rectifying circuit having an adjustable discharge rate (preferably set to the maximum shading rate) and a voltage comparator for comparing the amplitude excursions with the subsidiary peak rectifying circuit capacitor voltage to produce a switching pulse whevever the latter decays below the instantaneous video signal amplitude video signal to operate the HOLD-discharge circuit into a discharge state for the duration of the switching pulse. The capacitor voltage of the first peak rectifying circuit can either serve as a reference voltage for a voltage comparator forming the video signal detector or a gain control voltage for a variable-gain amplifier controlling the amplification of the video signal.

A second aspect provides a voltage clamping circuit to prevent the capacitor voltage of the peak rectifying circuit of the known detection device or a voltage derived therefrom from dropping below a value equivalent to the maximum shading level voltage. The second aspect may be employed independently of the first aspect.

13 Claims, 10 Drawing Figures

DETECTION DEVICES FOR IMAGE ANALYSIS SYSTEMS

Figure 1:
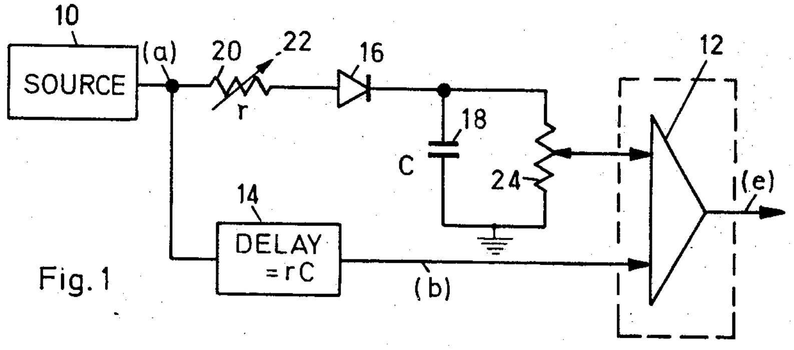

This invention concerns detection devices for image analysis systems. In particular the invention provides a modification which may be fitted to certain of the detection devices described in the Complete Specification of our cognate Application 53405/69 and 10560/70 and in U.S. Patent application No. 192,831.

The primary object of the invention is to reduce the errors which can arise during detection of the amplitude excursions of an amplitude modulated video signal when the video signal source is subject to so-called shading distortion.

By the term detection, we mean the conversion of amplitude excursions of the video signal which exceed a reference voltage into electrical pulses whose duration is equal to the duration of the amplitude excursion above the reference voltage. The resulting electrical pulses form a so-called detected video signal and can be used to compute parameters of features in a field under analysis.

When shading distortion is present, the same feature will produce a different amplitude excursion of the video signal when located in different parts of the field of view of the source of video signal. Where the source comprises a television camera set to view a white and evenly illuminated field shading distortion appears as a variation in the amplitude of the video signal as the inspection beam scans across the target. If there were no shading distortion the video signal amplitude both in the line and frame scan directions would remain constant.

If, in the example quoted above, the video signal is applied to a television monitor and the white field reproduced on the monitor screen, shading distortion will appear as grey regions in the otherwise white monitor display. Increased shading distortion will produce darker grey shaded regions and the darkest grey region caused by the shading distortion will be referred to as the maximum shading level.

Since the brightness (i.e. whiteness of greyness) of any point in the displayed image will be proportional to the amplitude of the video signal at that instant in the scan the maximum shading level can be denoted by a given voltage which will be somewhere between the video signal amplitude level corresponding to white and that corresponding to black.

In general the variation of sensitivity which produces shading distortion varies only slowly across the field. Thus the grey regions will not be well defined but will merge into the white regions. Further, when dealing with television camera tubes, the distortion is symmetrical about the centre of the target area (i.e. field of view) and produces a darkening towards the edges of the field. Where the video signal is obtained by line scanning, it is normally assumed that the electron beam moves with constant velocity along each line scan and as the beam traverses from a white to a shaded region the video signal amplitude will drop. The maximum shading rate is the maximum rate of change of voltage with time caused by the shading distortion which occurs during any of the line scans making up the complete raster.

As provided in the detection devices illustrated in and described with reference to FIGS. 14, 15 and 17 of the drawings accompanying the Complete Specification of our cognate British Patent Application 53405/69 and 10560/70, a voltage is generated which ideally corresponds at any instant in the scan to the local peak white amplitude level of the video signal. This is achieved by employing a rectifying diode to charge a capacitor which is only allowed to discharge slowly in relation to the charging time characteristic. Thus, while the electron beam scans a white area the capacitor is charged up to the video signal amplitude level corresponding to that white region but on a transition from white to grey the voltage across the capacitor does not immediately follow the sudden reduction in the instantaneous amplitude level of the video signal. Provided the video signal amplitude excursion from the white level is of relatively short duration the value of this voltage at the subsequent transition from grey to white will still be substantially the same as that at the earlier transition from white to grey. This voltage or one derived therefrom can serve as a control voltage either to determine the value of the reference voltage with which the instantaneous amplitude of the video signal is compared in the detection device to produce the detected video signal or to control the gain of a variable gain amplifier in the signal path of the video signal to a detector so as to increase the amplitude of the video signal in shaded areas. Such a detection device will be referred to as "of the type described."

According to one aspect of the present invention a detection device of the type described additionally comprises a HOLD-discharge circuit which normally prevents the capacitor voltage (or a voltage derived therefrom) from decaying, a second peak rectifying circuit having an adjustable discharge rate and comparator means for comparing the instantaneous video signal amplitude with the voltage from the second peak rectifying circuit to produce a switching pulse whenever the voltage from the second peak rectifying circuit drops below the instantaneous video signal amplitude, said HOLD-discharge circuit being responsive to a switching pulse to cause said capacitor to discharge.

The voltage across said capacitor may serve as the reference voltage in a comparator or as the gain control voltage for a variable-gain amplifier.

Preferably the discharge rate of the second peak rectifying circuit is set at the maximum shading rate.

On small features the results obtainable from a detection device incorporating this first aspect of the present invention will be similar to those obtained by the detection device illustrated in FIG. 14 of our previously mentioned co-pending British Patent Application. However superior results will be obtained for large features.

According to another aspect of the invention a detection device of the type described further comprises voltage clamping circuit means for preventing the said voltage or a voltage derived therefrom, from dropping below a value which corresponds to a voltage across the capacitor equal to the video signal amplitude level at the maximum shading level.

Conveniently the clamping circuit means comprises a source of voltage equal to the maximum shading level voltage and a rectifying diode connecting the source to the capacitor. In the event that the voltage across the capacitor drops below the maximum shading level voltage, the source provides current via the rectifying diode to charge the capacitor and maintain the voltage at the maximum shading level voltage.

This aspect is of particular advantage when the amplitude excursion of the video signal caused by a line scan intersecting a grey feature surrounded by white background, is of sufficiently long duration as would have allowed the voltage across the capacitor to discharge to a value such that the control voltage derived therefrom (for controlling either the reference or the automatic gain control) is no longer sufficient to maintain the previous relationship between the instantaneous video signal amplitude and the reference voltage. As soon as the instantaneous video signal amplitude is apparently greater than the reference voltage the detected video signal pulse will be terminated whether or not the video signal smplitude has reverted to the white level. Consequently shading distortion can produce shortening of the duration of the detected video signal pulses from features which produce video signal excursions greater than a critical given duration.

Provided therefore that the reference voltage is not required to lie between voltages corresponding to the maximum shading level and the peak white amplitude level of the video signal, the modification proposed by this second aspect of the present invention will allow correct duration video signal pulses to be obtained for any feature in a field of view whose grey level is significantly greater than the darkest grey caused by shading distortion. In practice it is usually possible to satisfy this last condition by appropriate illumination of the field viewed by the camera.

A particularly advantageous detection device is obtained by combining the first and second aspects of the present invention into a single detection device.

The invention will now be described by way of example with reference to the accompanying drawings in which:

FIG. 1 is a block schematic diagram of a detection device as illustrated and described in our earlier copending British Patent Application No. 53405/69 and 10560/70 (Cognate), and in U.S. Patent application No. 192,831.

Figure 2:
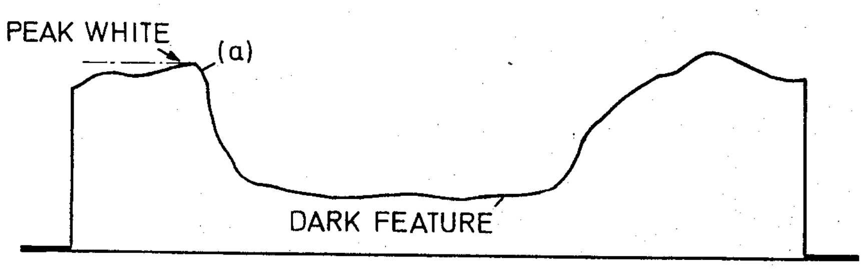
Figure 3:
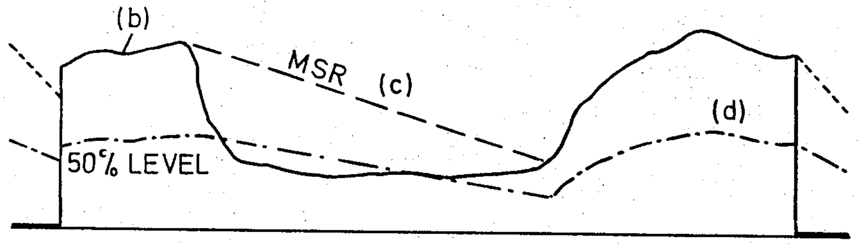
Figure 4:
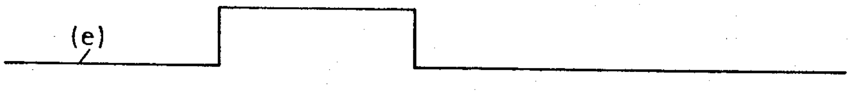
Figure 5:
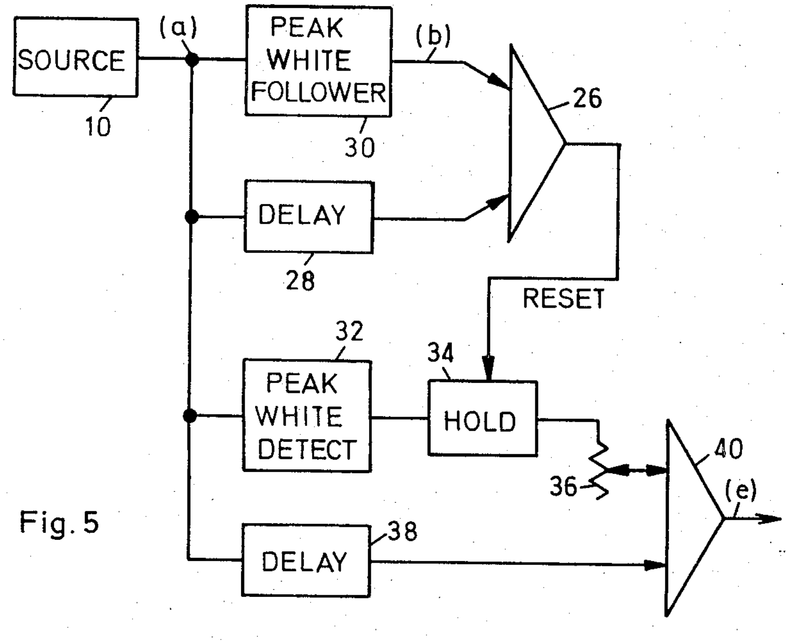
Figure 6:
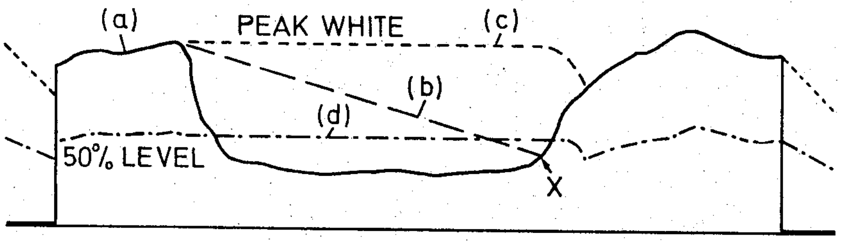
Figure 7:
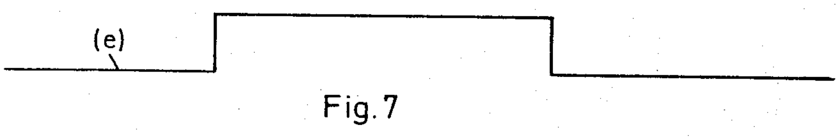
Figure 8:
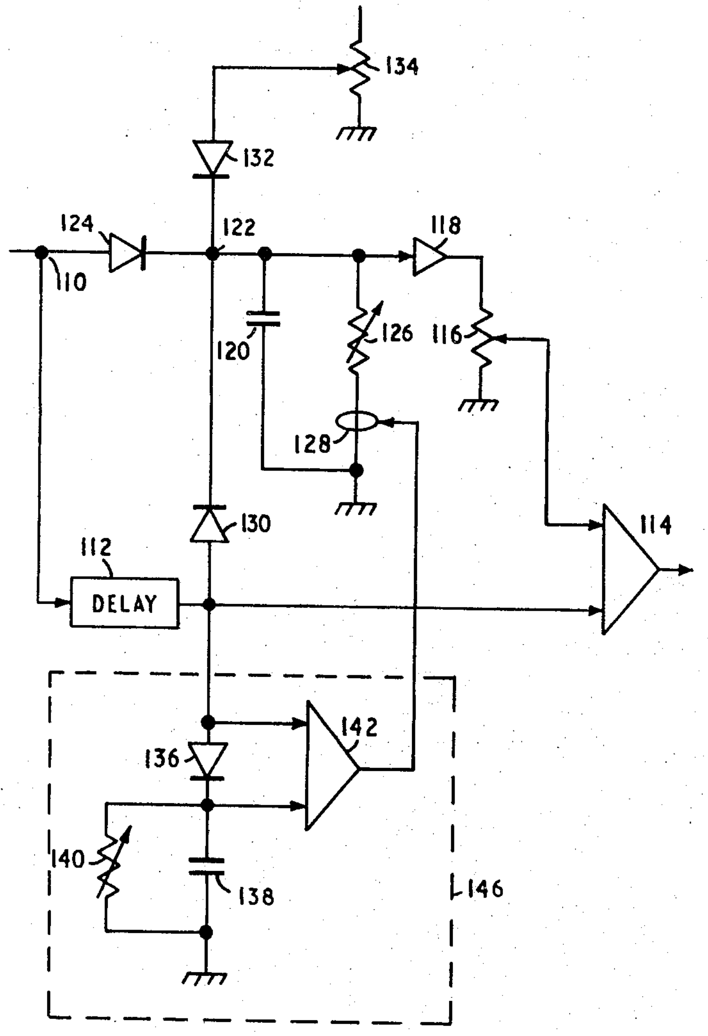
Figure 9:
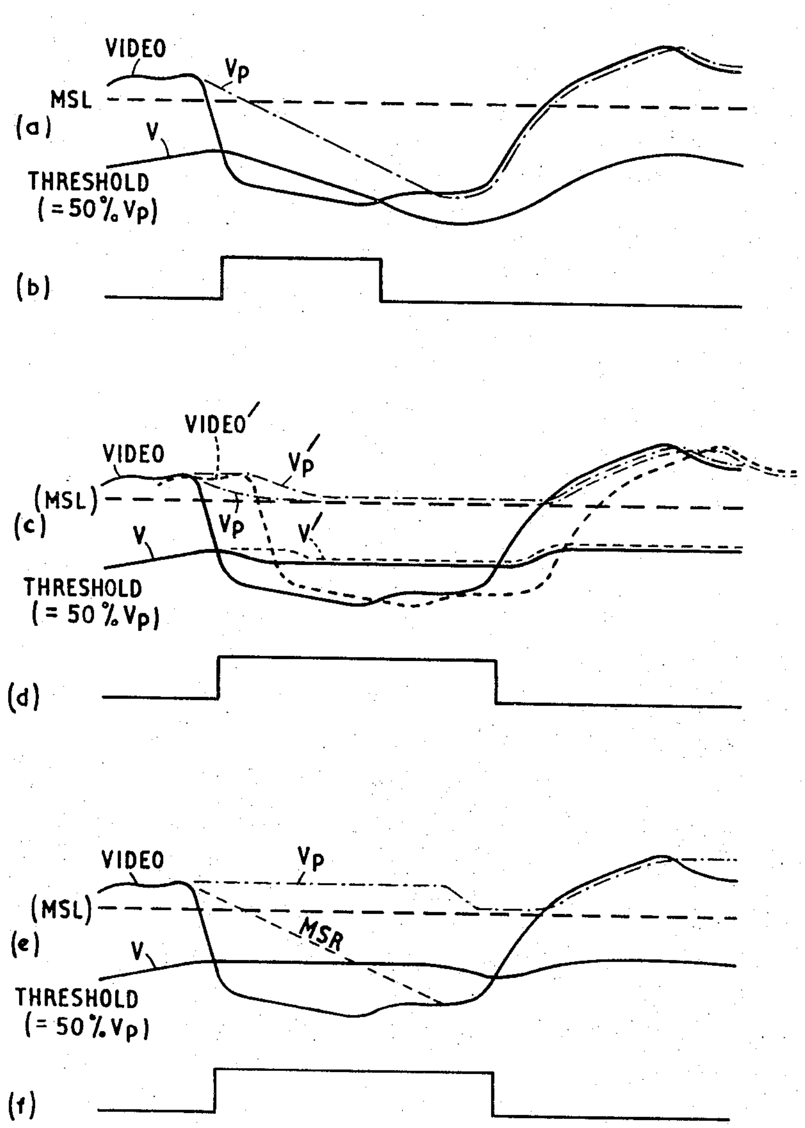
Figure 10:
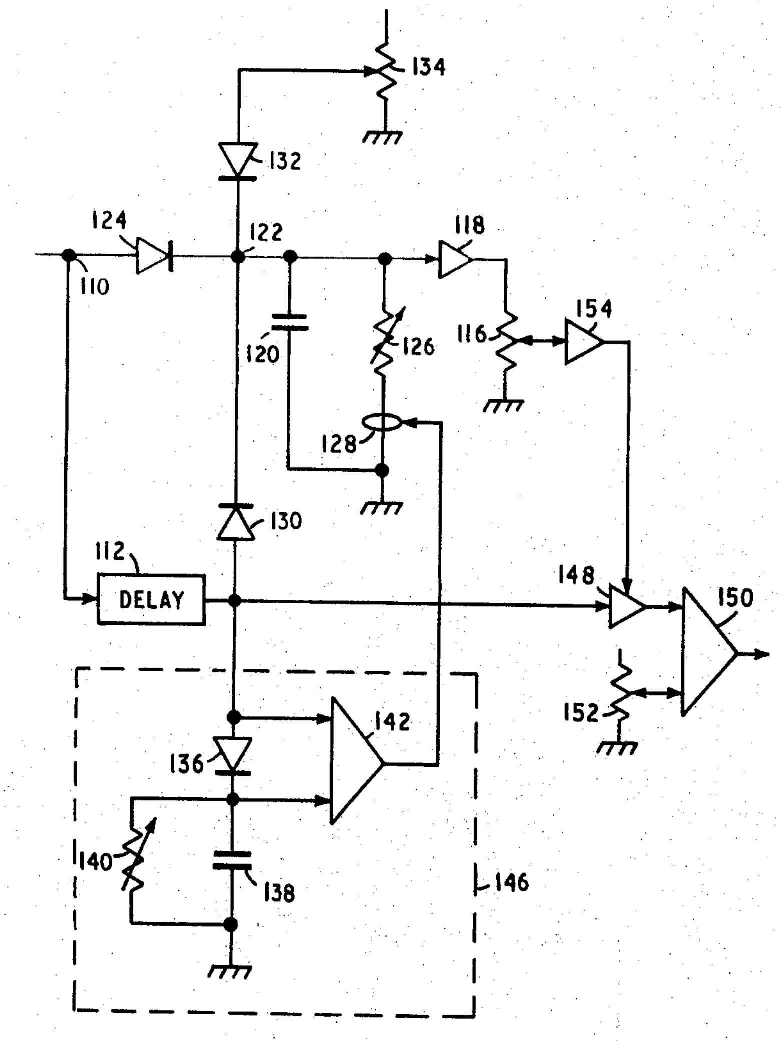

FIG. 2 is a graphical representation of the amplitude variation in a video signal derived from one line scan intersecting a large dark feature on a light background, FIG. 3 illustrates graphically the various voltages obtained at different points in the system of FIG. 1, FIG. 4 illustrates the two value detected output signal from the system of FIG. 1, FIG. 5 is a block circuit diagram of a detection device incorporating the first aspect of the present invention, FIG. 6 is a graphical representation similar to FIG. 3 and illustrates the various voltages obtainable at different points in the circuit of FIG. 5 superimposed on a video signal amplitude variation arising from a single line scan intersecting a large dark feature on a light background, FIG. 7 illustrates the two value detected output signal obtainable from the system of FIG. 5, FIG. 8 is a block circuit diagram of a detection device for producing a two value detected video signal from amplitude excursions of an amplitude modulated video signal and embodying a modification envisaged by the second aspect of the present invention, FIG. 9 illustrates electrical wave forms of signals obtainable at various points in the detection device of FIG. 8, and FIG. 10 is a block circuit diagram of an alternative detection device in which the amplitude of the video signal is controlled by a variable gain amplifier and in which the circuit generating the gain control voltage for the variable gain amplifier incorporates the second aspect of the invention.

FIG. 1 of the drawings illustrates the system illustrated in FIG. 14 of our co-pending British Patent Application No. 53405/69 and 10560/70 (Cognate) and in U.S. Patent application No. 192,831. The system comprises a source of scanned video signal 10, the output from the source 10 being supplied to a comparator 12 via a delay device 14 (which may be a delay line or a suitable shift register). At the same time the video signal is passed through a peak voltage integrator comprising a rectifying diode 16 and peak voltage capacitor 18 whose capacitance is designated C. The forward charging resistance of the circuit is designated by a series resistance 20 whose ohmic resistance is given by $r$. The ohmic resistance $r$ is variable by control 22 to vary the charging rate for capacitor 18. The peak voltage is developed across a potentiometer 24 connected in parallel with the capacitor 18 and the tapping of the potentiometer supplies the second input to the comparator 12. The comparator forms part of a detector the output of which comprises a binary signal which has one level when the instantaneous video signal is below the voltage on the potentiometer 24 and a second level when the instantaneous video signal equals or exceeds the potentiometer voltage. The voltage at the tapping of the potentiometer 24 therefore serves as a reference voltage with which the instantaneous value of the video signal can be compared.

The resistance of potentiometer 24 is made large compared with the resistance $r$ of resistor 20 so that the forward charging time constant of the peak value circuit is approximately given by the product of $r$ and C. The time delay introduced by the time delay device 14 is thus made approximately equal to the time constant $r$ C.

Referring now to FIGS. 2 and 3, the wave form illustrated in FIG. 2 illustrates a typical video signal amplitude variation which would appear at point $a$ in FIG. 1 as a single line scan intersects a large dark feature on a white background. In FIG. 3 other voltages obtainable at points $c$ and $d$ are shown superimposed on the delayed wave form of FIG. 2 — shown at $b$ in FIG. 3. The waveform $c$ corresponds to the decaying voltage across the potentiometer 24 due to the leakage of the charge from the capacitor 18 through the potentiometer 24. The rate of discharge is set so as to correspond to the maximum likely rate of change of sensitivity over the camera target and is thus referred to as the maximum shading rate MSR. The potentiometer tapping is set at a 50 percent mark and the voltage obtainable from the tapping over the whole line scan is shown at $d$ in FIG. 3.

The output from the detector formed by the comparator 12 is shown in FIG. 4 at $e$. Since potentiometer 24 has been set at the 50 percent mark, the comparator 12 will provide a binary output indicating the presence of a feature over that portion of the line scan during which the instantaneous video signal amplitude is below the 50 percent detection level $d$. FIG. 3 illustrates quite clearly the error introduced by the decaying voltage across the potentiometer 24 when the latter is set to give 50 percent detection. Obviously at a higher detection level setting this error will be reduced. It will be seen that the duration of the binary detected output signal *e* is approximately one half the actual duration of the amplitude change in the video signal corresponding to the line scan intersection with the feature.

FIG. 5 is a block circuit diagrm which illustrates the first aspect of the present invention and the waveforms in FIGS. 6 and 7 have been derived from a video signal amplitude variation similar to that employed to illustrate the operation of the circuit of FIG. 1. Consequently FIGS. 6 and 3 can be compared as also can FIGS. 7 and 4 whereupon the improvement obtained by the first aspect of the present invention can readily be seen.

In FIG. 5 the video signal from a source 10 is applied to a first comparator 26 via a delay device 28 and also to a peak white follower circuit 30. The peak white follower circuit may conveniently comprise the components 16, 18, 20 and 24 of the system illustrated in FIG. 1 in which the potentiometer tapping is permanently at the top end so that the input to the comparator 26 from the potentiometer always equals the 100 percent peak white level. The decay of the voltage across the potentiometer due to a drop in the amplitude of video signal is illustrated at *b* in FIG. 6. This decaying voltage corresponds to the MSR line *c* of FIG. 3. The comparator 26 provides a detected output signal which begins with the leading edge of the change in amplitude due to the feature and ends when the decaying voltage across the potentiometer equals the instantaneous level of the video signal amplitude. This point is indicated *x* in FIG. 6.

The trailing edge of the binary detected output pulse from the comparator 26 indicates that beyond that point (in time) the peak white value of the video signal may drop (due to shading) below the last known peak white level (just before the beginning of the feature). However up until that time (denoted by *x* in FIG. 6) it is reasonable to assume that the peak white level has not varied substantially and in accordance with the first aspect of the invention, the device of FIG. 5 includes a second peak white detector 32 also supplied with video signal from the source 10 but which does not include a leakage path for the charge in the capacitor 18 so that whatever the charge in the capacitor at the beginning of a feature, this charge will be maintained. A separate discharge device is provided for capacitor 18 in a HOLD circuit 34 which is prevented from discharging the capacitor in the peak white detector 32 until a trailing edge of the binary detected output signal from the comparator 26, is received. This indicates that point *x* in time has arrived and at this point a discharge circuit is introduced to cause the voltage across the capacitor in the peak white detector 32 to decay until such time as the voltage there across is equal to the instantaneous video signal amplitude. At that point the HOLD circuit is arranged to remove the discharge circuit from the capacitor so that the capacitor can once again follow the peak white level of the video signal and hold its charge at the new peak white during subsequent features.

The output from the peak white detector 32 via the HOLD circuit 34 is applied to a potentiometer 36 and the voltage applied thereto is shown at *c* in FIG. 6. It will be seen that this voltage remains constant for the duration of the feature until the point *x* is reached in time at which point the voltage *c* decays towards the video signal. The voltage at the tapping of the potentiometer 36 is shown at *d* in FIG. 6 and it will be seen that this remains substantially constant for the duration of the feature chosen in this particular example.

The video signal from the source 10 is also applied via a delay device 38 to a comparator 40 forming a detector the output of which is a binary signal illustrated at *e* in FIG. 7. by comparing FIG. 7 with FIG. 4 it will be seen that the duration of the binary output signal of the detector 40 is considerably more accurate than the corresponding binary output signal of the detector - comparator 12 of FIG. 1.

In FIG. 8 an amplitude modulated video signal is applied to junction 110 and after being delayed by delay device 112 is applied to one input of a comparator 114 which serves to compare the instantaneous amplitude of the delayed video signal with a reference voltage applied to the other input. The output of the comparator comprises a series of electrical pulses commonly referred to as a detected video signal, each pulse corresponding to an amplitude excursion of the video signal which exceeds the reference voltage and being of duration equal to that for which the video signal amplitude exceeds the reference voltage.

The reference voltage is obtained from the tapping of a potentiometer 116 which is provided with current from an amplifier 118. The output current is controlled by the voltage across a capacitor 120 connected between junction 122 and earth. Capacitor 120 is charged via rectifying diode 124 and discharged through an adjustable resistor 126. The presence of gate 128 will be ignored for the time being and it will be assumed that this gate is permanently open thereby connecting resistor 126 across capacitor 120.

In addition the presence of rectifying diode 130 and delay 112 will be ignored for the time being.

In accordance with the second aspect of the invention, a further rectifying diode 132 is connected between junction 122 and the tapping of a potentiometer 134 and the latter adjusted so that the voltage appearing at the tapping is equal to the maximum shading level voltage. While the voltage at junction 110 exceeds the maximum shading level voltage (MSL) capacitor 120 is charged via diode 124. In the event that the voltage at junction 110 drops below the MSL voltage, capacitor 120 is maintained at this voltage by current through the diode 132 from the potentiometer 134. The potentiometer 134 is accordingly supplied from a suitable source of EMF capable of supplying the charging current to maintain the voltage across capacitor 120 at the MSL voltage.

The voltage waveforms in FIG. 9(*a*) illustrate those obtainable in the comparator 114 and at the reference voltage potentiometer 116 without the modification proposed by the second aspect of the invention and with delay 112 and rectifying diode 130 missing. The voltage across potentiometer 116 is denoted in FIG. 9(*a*) by the chain dotted line indicated by Vp. The solid line V denotes the voltage at tapping of potentiometer 116 and the solid line labelled VIDEO the signal applied to the other input of comparator 114. FIG. 9(*b*) illustrates the detected video signal pulse obtained without the modification proposed by this second aspect of the invention.

FIG. 9(*c*) illustrates the voltage Vp obtained across potentiometer 116 when diode 132 and potentiometer 134 are included, for the same video signal amplitude excursion as shown in FIG. 9(*a*). The actual threshold voltage is shown at V in FIG. 9(*c*) and the resulting detected video signal pulse in FIG. 9(*d*).

The effect of delay 112 is to delay the signal applied to the second input of comparator 114 relative to the signal applied via diode 124 to junction 122. The presence of diode 130 ensures that the voltage at junction 122 is always derived from the higher of the amplitudes of the original and delayed video signal. In view of this, the circuit formed by delay 112 and rectifying diode 130 has no effect on the leading edge conditions of a downward voltage excursion in the video signal but makes available the rising trailing edge of the excursion earlier in time for the reference voltage generating circuit than for the second input of the comparator 114. This effect is shown in FIG. 9(*c*) in which the solid VIDEO line is the video signal supplied to junction 110 and the dotted VIDEO line labelled VIDEO′ the delayed video signal applied to the second input of comparator 114. The voltage Vp across the potentiometer 116 is held at the peak value until the amplitude of the delayed signal begins to drop at the leading edge of the excursion and this is denoted by the double chain dotted line Vp′. In consequence the voltage V at the tapping of the potentiometer is also maintained at the higher value for a longer period of time as shown by the dotted line V′.

At the trailing edge of the voltage excursion the peak voltage across the potentiometer 116, (Vp), rises with the rising trailing edge of the excursion as before, causing the tapping voltage V to rise at the same point in time (which is somewhat earlier than the corresponding rise in the trailing edge of the voltage excursion in the delayed video signal applied to the comparator 114). In this way the voltage V at the tapping of potentiometer 116 will have achieved the true 50 percent value for the local peak white in advance of the appearance of the trailing edge of the delayed video signal at comparator 114 as shown by the remainder of the dotted line V′ in the region of the trailing edge of the voltage excursion of FIG. 9(*c*).

A further advantage is obtained by employing the circuit modification described in the earlier Figures of the drawings and denoted by the additional rectifying diode 136, peak storage capacitor 138, adjustable resistor 140 for controlling the rate of discharge of the capacitor 138 and additional comparator 142 whose output controls the opening and closing of gate 128 (previously referred to).

As described above the action of this circuit modification is to hold the last known peak white voltage (Vp) until the voltage across capacitor 138 has decayed to a value which is equal to the instantaneous amplitude level of the video signal within a feature. To this end the decay rate of the voltage across capacitor 138 is made equal to or just greater than the rate of change of video signal voltage due to the maximum shading rate of the source. The action of the comparator 142 enables the gate 128 to be normally closed thereby preventing discharge of capacitor 120 and causing the peak voltage stored in capacitor 120 to be held at a substantially constant value as denoted by Vp in FIG. 9(*e*). If at any time the voltage across capacitor 138 drops to the value of the voltage from delay 112, comparator 142 operates to open gate 128 and cause comparator 120 to discharge, the discharge characteristic being shown at 144 in FIG. 9(*e*). However it will be seen that the circuit is such that the decay of voltage across capacitor 120 is limited to the maximum shading level.

For clarity the additional voltage waveforms and advantages obtained by employing delay 112 and rectifying diode 130 are not included in FIG. 9(*e*) but it is to be understood that the same advantage can be obtained by including the delay 112 and rectifying diode 130 in addition to the circuit refinement contained in dotted outline 146, and as described with reference to FIG. 8 and FIG. 9(*c*).

The detected video signal pulse from comparator 114 is again shown in FIG. 9(*f*) and it will be seen that the size of the detected video signal pulse remains unaltered for the particular size of feature chosen, whether or not the circuit refinement contained within dotted outline 146 is incorporated. However the voltage Vp remains at the higher value for a longer period of time when the refinement 146 is incorporated and this can be of distinct advantage if the feature includes light grey regions which are sufficient to satisfy the detection criterion i.e. the voltage level is less than 50 percent of the local peak white voltage at the beginning of the excursion, but which may well intersect the threshold voltage V produced from a Vp voltage corresponding to the maximum shading level. It will also be seen that the combination delay 112 and rectifier 130 together with the refinement 146 will maintain the voltage Vp substantially constant during any video signal excursion caused by a line scan intersection with a feature provided the duration of the line scan intersection beyond the point at which the decaying voltage across capacitor 138 equals the feature video signal amplitude, is no greater than the delay introduced by delay 112.

In FIG. 10 the invention is applied to a circuit for producing a gain control voltage for a variable gain amplifier 148 which controls the instantaneous amplitude of the video signal supplied to one input of a comparator 150 (which corresponds to comparator 114 of FIG. 8). A reference voltage is supplied to the other input of the comparator 150 from the tapping of a potentiometer 152 supplied with constant voltage. The comparator 150 supplies an output pulse as long as the video signal amplitude exceeds the reference voltage and thus provides a detected video signal as output.

The remainder of the circuit is similar to the circuit of FIG. 8 and the same reference numerals have been employed throughout. However the voltage obtained at the tapping of the potentioneter 116 is not employed as the reference voltage (for comparison with the video signal amplitudes) but is amplified in amplifier 154 to provide a suitable voltage for controlling the gain of amplifier 148 in such a manner as to increase the gain when the signal from potentioneter 116 is low and reduces the gain when this signal is high.

It will be noted that the basic circuit is similar to that of FIG. 17 of the drawings accompanying the complete specification of out co-pending British Patent application No. 53405/69 and 10560/70 (Cognate). The function of this basic circuit is as described with reference to that Figure and the function of the modifications such as the circuit contained within dotted outline 146; rectifying diode 130 and rectifying diode 132 and potentiometer 134 are as described with reference to FIG. 8 hereof, reading "gain control voltage" for "reference voltage."

Although the invention has been applied so as to maintain the actual voltage across the capacitor 120 at or greater than a given voltage (=MSL), it is to be understood that rectifying diode 132 may alternately be connected to the upper end of potentiometer 116 (in either FIG. 8 or FIG. 10) so as to maintain the voltage across the latter at or greater than the MSL voltage.

We claim:

1. A detection system for amplitude varying video signals comprising, a first peak rectifying circuit including a first capacitor for detecting and storing the peak voltage value of said amplitude varying video signal, means for generating a reference voltage from said stored peak voltage, first comparator means for comparing said amplitude varying video signal with said reference voltage, a switchable holding and discharging circuit connected to said first peak rectifying circuit for preventing said stored peak voltage from decaying until said holding and discharging circuit is activated by a switching pulse, a second peak rectifying circuit having an adjustable discharge rate and including a second capacitor, to which said video signal is inputted, second comparator means for comparing the instantaneous video signal amplitude with the voltage output from said second peak rectifying circuit to produce a switching pulse when the voltage from said second peak rectifying circuit decays below the instantaneous video signal amplitude, said holding and discharging circuit being connected to said second comparator means and being activated by said switching pulse to provide a discharge path for said capacitor of said first peak rectifying circuit.

2. A system as set forth in claim 1 wherein the adjustable discharge rate of the second peak rectifying circuit is set at the maximum shading rate.

3. A system as set forth in claim 1 further comprising signal delay means for delaying the video signal before it is applied to said first comparator means.

4. A system as set forth in claim 1 further comprising:

voltage clamping circuit means for preventing said stored peaks voltage from decaying below a value equal to the maximum shading level voltage.

5. A detection system for amplitude varying video signals comprising, a peak rectifying circuit including a capacitor for detecting and storing the peak voltage value of said amplitude varying video signal, means for generating a reference voltage from said stored peak voltage, comparator means for comparing said amplitude varying video signal with said reference voltage, and voltage clamping circuit means for preventing a voltage determined by said stored peak voltage from decaying below a value equivalent to the maximum shading level voltage.

6. A system as set forth in claim 5 wherein said voltage clamping circuit means prevents said storage peak from decaying below the maximum shading level voltage.

7. A system as set forth in claim 6 wherein said voltage clamping circuit means comprises:

a source of voltage equal to the maximum shading level voltage and a rectifying diode connecting said source to the capacitor of said peak rectifying circuit.

8. A detection device as set forth in claim 7 wherein the source of voltage is adjustable.

9. A system as set forth in claim 5 further comprising delay means for delaying the video signal before it is inputted to said comparator means.

10. A detection system for amplitude varying video signals comprising, a first peak rectifying circuit including a first capacitor for detecting and storing the peak voltage value of said amplitude varying video signal a variable gain amplifier, means for supplying the varying amplitude video signal to the variable gain amplifier as an input signal thereto, means for deriving a gain control voltage for said amplifier from said stored peak voltage and for inputting said gain control voltage to said amplifier to control the gain thereof, a source of reference potential, first signal comparator means for comparing the output signal of said variable gain amplifier with a reference voltage derived from said source of reference potential, a switchable holding and discharging circuit connected to said first peak rectifying circuit for preventing said stored peak voltage from decaying until said holding and discharging circuit is activated by a switching pulse, a second peak rectifying circuit having an adjustable discharge rate and including a second capacitor, to which second video signal is inputted, second comparator means for comparing the instantaneous video signal amplitude with the voltage output from said second peak rectifying circuit to produce a switching pulse when the voltage from said second peak rectifying circuit decays below the instantaneous video signal amplitude, said holding and discharging circuit being connected to said second comparator means and being activated by said switching pulse to provide a discharge path for said capacitor of said first peak rectifying circuit.

11. A detection system for amplitude varying video signals comprising, a peak rectifying circuit including a capacitor for detecting and storing the peak voltage value of said amplitude varying video signal, a variable gain amplifier, means for supplying the varying amplitude video signal to the variable gain amplifier as an input signal thereto, means for deriving a gain control voltage for said amplifier from said stored peak voltage and for inputting said gain control voltage to said amplifier to control the gain thereof, a source of reference potential, signal comparator means for comparing the output signal of said variable gain amplifier with a reference voltage derived from said source of reference potential, and voltage clamping circuit means for preventing a voltage determined by said stored peak voltage from decaying below a value equivalent to the maximum shading level voltage.

12. A method of detecting an amplitude varying video signal comprising, detecting the peak voltage of said amplitude varying video signal, storing said peak voltage, generating a reference voltage from said stored peak voltage, comparing said amplitude varying video signal with said reference voltage, clamping a voltage determined by said stored peak voltage to a voltage source whose output voltage is adjustable, and adjusting the output voltage of said source to be equal to the maximum shading level voltage whereby said voltage determined by said stored peak voltage cannot decay below the maximum shading level voltage.

13. A method of detecting an amplitude varying video signal comprising, detecting the peak voltage of said amplitude varying video signal,
amplifying said varying amplitude video signal by an amount determined by a voltage which is related to said detected peak voltage,
comparing said amplified signal with a first reference voltage,
clamping a voltage determined by said peak voltage to a voltage source whose output is adjustable,
and adjusting the output voltage of said source to be equal to the maximum shading level voltage whereby said stored peak voltage cannot decay below the maximum shading level voltage.

* * * * *